(12) United States Patent
Miller et al.

(10) Patent No.: US 7,275,249 B1
(45) Date of Patent: Sep. 25, 2007

(54) DYNAMICALLY GENERATING MASKS FOR THREAD SCHEDULING IN A MULTIPROCESSOR SYSTEM

(75) Inventors: Matthew Miller, Rancho Santa Margarita, CA (US); Robert Len Walker, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 954 days.

(21) Appl. No.: 10/334,341

(22) Filed: Dec. 30, 2002

Related U.S. Application Data

(63) Continuation-in-part of application No. 10/209,454, filed on Jul. 30, 2002, now Pat. No. 7,093,258.

(51) Int. Cl.
*G06F 9/46* (2006.01)
(52) U.S. Cl. ..................... 718/105; 718/102
(58) Field of Classification Search ......... 718/100–108
See application file for complete search history.

(56) References Cited

U.S. PATENT DOCUMENTS

| | | | |
|---|---|---|---|
| 4,809,157 A * | 2/1989 | Eilert et al. ................. | 718/104 |
| 5,301,324 A * | 4/1994 | Dewey et al. ............... | 718/105 |
| 6,658,448 B1 * | 12/2003 | Stefaniak et al. ........... | 718/104 |
| 6,721,874 B1 * | 4/2004 | Le et al. ...................... | 712/218 |
| 6,724,410 B2 * | 4/2004 | Arai ............................ | 347/115 |
| 2002/0103847 A1 * | 8/2002 | Potash ......................... | 709/107 |
| 2003/0088608 A1 * | 5/2003 | McDonald ................... | 709/106 |
| 2004/0019891 A1 * | 1/2004 | Koenen ....................... | 718/102 |
| 2004/0054999 A1 * | 3/2004 | Willen et al. ............... | 718/103 |

OTHER PUBLICATIONS

IBM Technical Disclosure Bulletin. "Task/CPU Affinity Design." Jul. 1973.*
Lee, Shu-Ling et al. "A Cost-Effective Scheduling with Load Balancing for Multiprocessor Systems." IEEE. 2000.*
Zhou, Songnian et al. "Processor Pool-Based Scheduling for Large-Scale NUMA Multiprocessors." ACM. 1991.*

* cited by examiner

*Primary Examiner*—Lewis A. Bullock, Jr.
(74) *Attorney, Agent, or Firm*—Phuong-Quan Hoang; Charles A. Johnson; Richard J. Gregson

(57) ABSTRACT

An embodiment of the invention is a technique to generate a mask schedule for thread scheduling in a multiprocessor system having N clusters of processors. A primary mask is obtained from a primary set of granularity masks. The granularity masks are created according to a thread granularity. The primary mask is filtered using a filter mask to generate a first affinity mask.

60 Claims, 9 Drawing Sheets

DYNAMICALLY GENERATING MASKS FOR THREAD SCHEDULING IN A MULTIPROCESSOR SYSTEM

CROSS-REFERENCE TO RELATED APPLICATIONS

This application is a continuation-in-part of the application Ser. No. 10/209,454 entitled "Method And System For Managing Distribution Of Computer-Executable Program Threads Between Central Processing Units In A Multi-Central Processing Unit Computer System", filed on Jul. 30, 2002, and assigned to the same assignee, issued as U.S. Pat. No. 7,093,258 on Aug. 15, 2006. This application is related to the following patent applications: Ser. No. 10/334,368 entitled "AFFINITIZING THREADS IN A MULTIPROCESSOR SYSTEM"; Ser. No. 10/334,369 entitled "SELECTING PROCESSOR CONFIGURATION BASED ON THREAD USAGE N A MULTIPROCESSOR SYSTEM", all filed on the same date and assigned to the same assignee as the present application, the contents of each of which are herein incorporated by reference.

BACKGROUND

1. Field of the Invention

Embodiments of the invention relates to the field of operating systems, and more specifically, to thread management.

2. Description of Related Art

Multithreading technologies have become popular in multiprocessor systems to support various levels of parallelism, to enable dynamic load balancing, to support virtual processors, and to enhance system performance. One of the challenges in designing an efficient multithreaded multiprocessor system is thread scheduling.

The performance of a multithreaded multiprocessor system depends on a number of factors such as local memory utilization, thread communication, and load balancing. To achieve high performance, a scheduling policy should select processors for thread assignment such that the overall processor utilization is optimized for a particular application. This problem is difficult because as the number of resources increases, the total number of possible configurations of combinations of processors also increases. The exact number of processors available at run time may not be known in advance. Therefore, the pre-determination of possible processor configurations for a particular application under some specific system-level constraints is almost impossible. An exhaustive search of all possible processor configurations is computationally expensive and the resulting exhaustive list occupies wasted memory storage. In addition, since thread scheduling is performed at run time, a search for a suitable processor configuration from this exhaustive list takes up a lot of system resources.

SUMMARY OF INVENTION

An embodiment of the invention is a technique to generate a mask schedule for thread scheduling in a multiprocessor system having N clusters of processors. A primary mask is obtained from a primary set of granularity masks. The granularity masks are created according to a thread granularity. The primary mask is filtered using a filter mask to generate a first affinity mask.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the invention is a technique to generate a mask schedule for thread scheduling in a multiprocessor system having N clusters of processors. A primary mask is obtained from a primary set of granularity masks. The granularity masks are created according to a thread granularity. The primary mask is filtered using a filter mask to generate a first affinity mask.

In the following description, numerous specific details are set forth. However, it is understood that embodiments of the invention may be practiced without these specific details. In other instances, well-known circuits, structures, and techniques have not been shown in order not to obscure the understanding of this description.

Figure 1A:
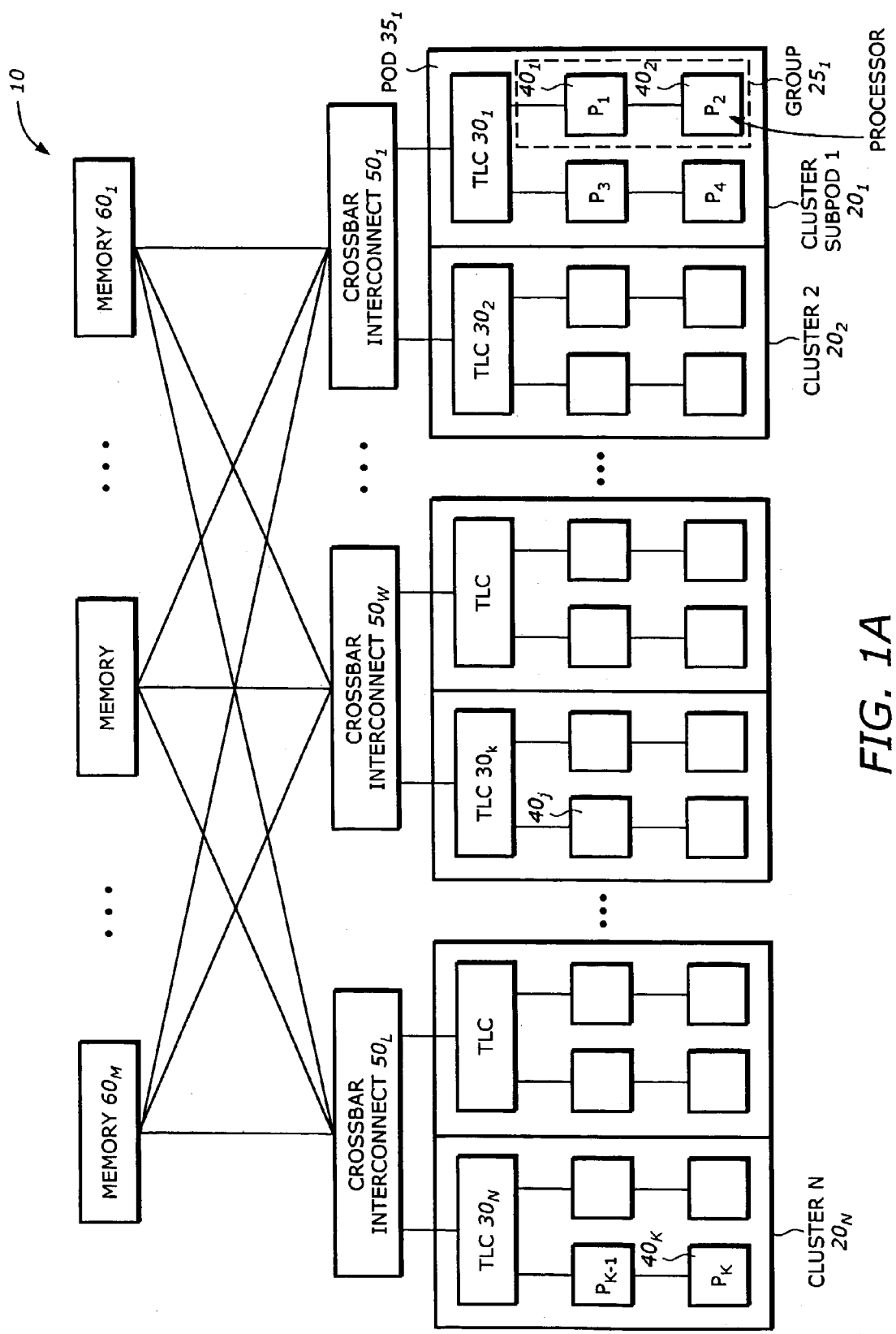
FIG. 1A is a diagram illustrating a system in which one embodiment of the invention can be practiced.

FIG. 1A is a diagram illustrating a system 10 in which one embodiment of the invention can be practiced. The system 10 includes N clusters of processors $20_1$ to $20_N$, L crossbar interconnects $50_1$ to $50_L$ and M memories $60_1$ to $60_M$. The system 10 is referred to as a cellular multiprocessor (CMP) system.

Each of the clusters of processors $20_1$ to $20_N$ forms a subpod and includes a number of processor subsystems $40_j$'s and a third level cache (TLC) $30_k$'s. The processor subsystems $40_j$'s within each cluster $20_i$ further form into groups connected together via a bus structure. Each group is connected to a TLC $30_k$. For example, processor subsystems $40_1$ and $40_2$ form a group $25_1$. It is contemplated that the number of processor subsystems $40_j$'s in a group and the number of groups in a cluster may be any suitable number according to the configuration. As illustrated in FIG. 1A, the processor subsystems $40_j$'s form into two groups and each group consists of two processor subsystems. Each of the TLC $30_k$'s provides another level of cache memory in addition to the second level (L2) and first level (L1) caches in each of the processor subsystems $40_j$'s. Each of the TLC $30_k$'s provides a larger cache memory than the L2 and L1 caches of the corresponding processor subsystems to improve performance by allowing the processors within a subpod or group to share cached information. The TLC $30_k$'s may be implemented by any suitable memory technologies, including static random access memory (SRAM) and dynamic random access memory (DRAM). It is contemplated that a cache coherence protocol is maintained throughout the system 10.

Each of the crossbar interconnects $50_1$ to $50_L$ is a crossbar switch connected to the memories $60_1$ to $60_M$ and a number of clusters of processors. The clusters of processors that are connected to each crossbar interconnect form a pod. For example, the subpods or clusters $20_1$ and $20_2$ form a pod $35_1$. The crossbar interconnect $50_m$'s fully connects any one of memories $60_1$ to $60_M$ to any one of the clusters of processors in the pod that it is connected to. Each of the memories $60_1$ to $60_M$ is accessible to any of the processor subsystems $40_j$'s via the crossbar interconnects $50_m$'s. The memories may be implemented by any suitable memory technologies including SRAM and DRAM.

The configuration of the CMP system 10 provides a flexible mechanism for thread scheduling and thread affinity management. A thread is a unit of program or code. A thread may be created by an application, a virtual machine, or the operating system. Thread affinitization is a process to assign a thread to a processor or a cluster of processors. When a thread is affinitized to a cluster of processors, it is executed within the processors in that cluster. Thread affinitization is a main task in thread scheduling. The thread affinity granularity refers to the degree of clustering of the processor subsystems $40_j$'s in thread affinity management. The granularity may be at the processor level, at the bus level (e.g., two processors connected to the TLC via a bus), at the subpod level (e.g., four processors connected to the TLC), at the pod level (e.g., eight processors connected to a common crossbar switch), or at any number of processors. The thread granularity may be statically provided via user's input or dynamically changed according to the system behavior.

Figure 1B:
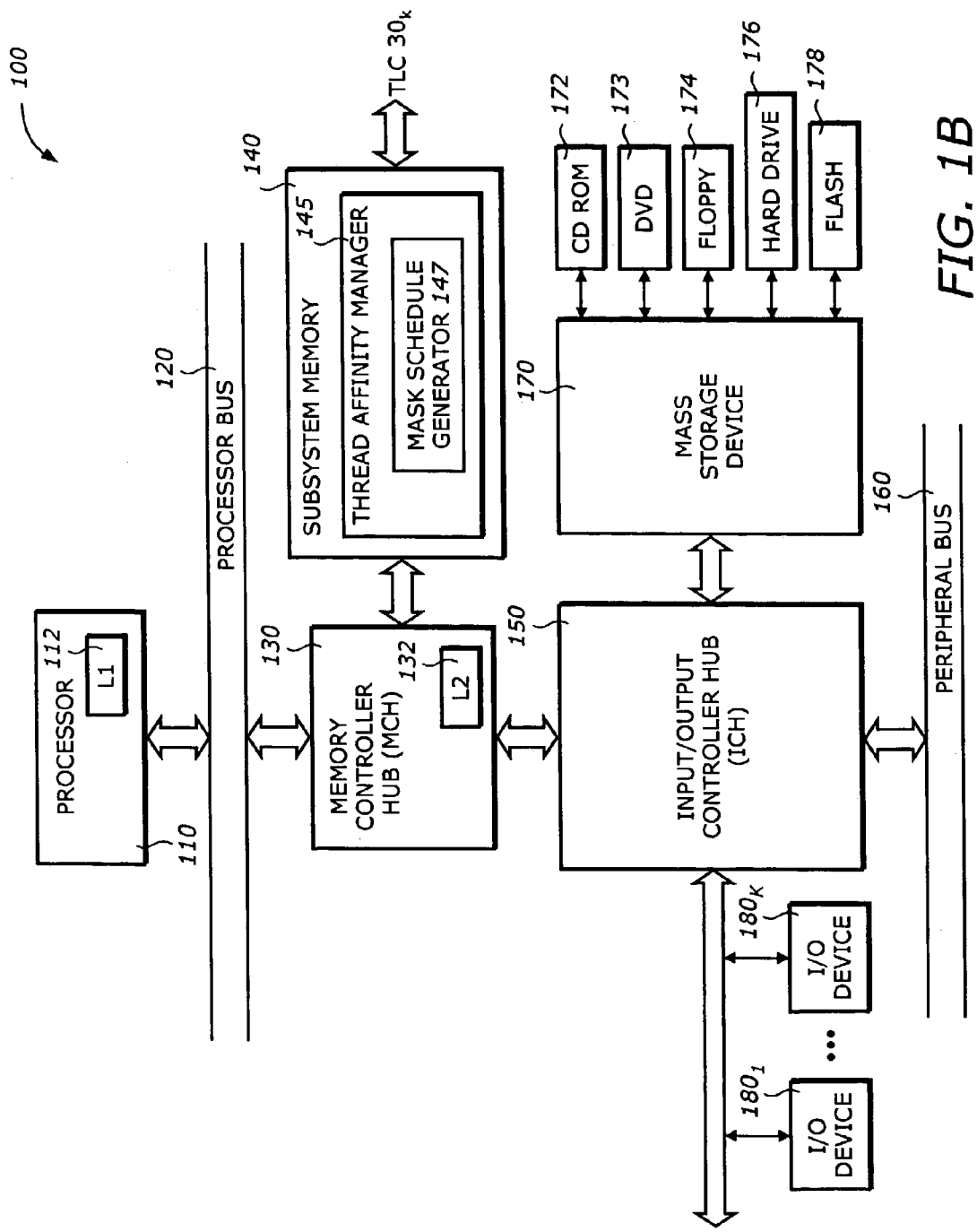
FIG. 1B is a diagram illustrating a processor subsystem according to one embodiment of the invention.

FIG. 1B is a diagram illustrating a processor subsystem 40 in which one embodiment of the invention can be practiced. The processor subsystem 40 includes a processor 110, a processor bus 120, a memory control hub (MCH) 130, a subsystem memory 140, an input/output control hub (ICH) 150, a peripheral bus 160, a mass storage device 170, and input/output devices $180_1$ to $180_K$. Note that the processor subsystem 40 may include more or less elements than these elements. The processor subsystem 40 may also be used to emulate or simulate the CMP using the thread affinity management technique described in the following.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. The processor 110 typically includes a first level (L1) cache 112.

The processor bus 120 provides interface signals to allow the processor 110 to communicate with other processors or devices, e.g., the MCH 130. The processor bus 120 may support a uni-processor or multiprocessor configuration. The processor bus 120 may be parallel, sequential, pipelined, asynchronous, synchronous, or any combination thereof.

The MCH 130 provides control and configuration of memory and input/output devices such as a second level cache (L2) 132, the system memory 140, the ICH 150, and the TLC $30_K$. The MCH 130 may be integrated into a chipset that integrates multiple functionalities such as the isolated execution mode, host-to-peripheral bus interface, memory control. The MCH 130 interfaces to the peripheral bus 160. For clarity, not all the peripheral buses are shown. It is contemplated that the subsystem 40 may also include peripheral buses such as Peripheral Component Interconnect (PCI), accelerated graphics port (AGP), Industry Standard Architecture (ISA) bus, and Universal Serial Bus (USB), etc.

The subsystem memory 140 stores system code and data. The subsystem memory 140 is typically implemented with dynamic random access memory (DRAM) or static random access memory (SRAM). The subsystem memory may include program code or code segments implementing one embodiment of the invention. The subsystem memory includes a thread affinity manager 145. Any one of the elements of the thread affinity manager 145 may be implemented by hardware, software, firmware, microcode, or any combination thereof. The thread affinity manager 145 includes a mask schedule generator 147 to generates affinity masks to be used in thread scheduling. The subsystem memory 140 may also include other programs or data which are not shown, such as an operating system. The thread affinity manager 145 contains program code that, when executed by the processor 110, causes the processor 110 to perform operations as described below.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 160, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, a digital video/versatile disc (DVD) 173, floppy drive 174, hard drive 176, flash memory 178, and any other magnetic or optic storage devices. The mass storage device 170 provides a mechanism to read machine-accessible media. The machine-accessible media may contain computer readable program code to perform tasks as described in the following.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 2:
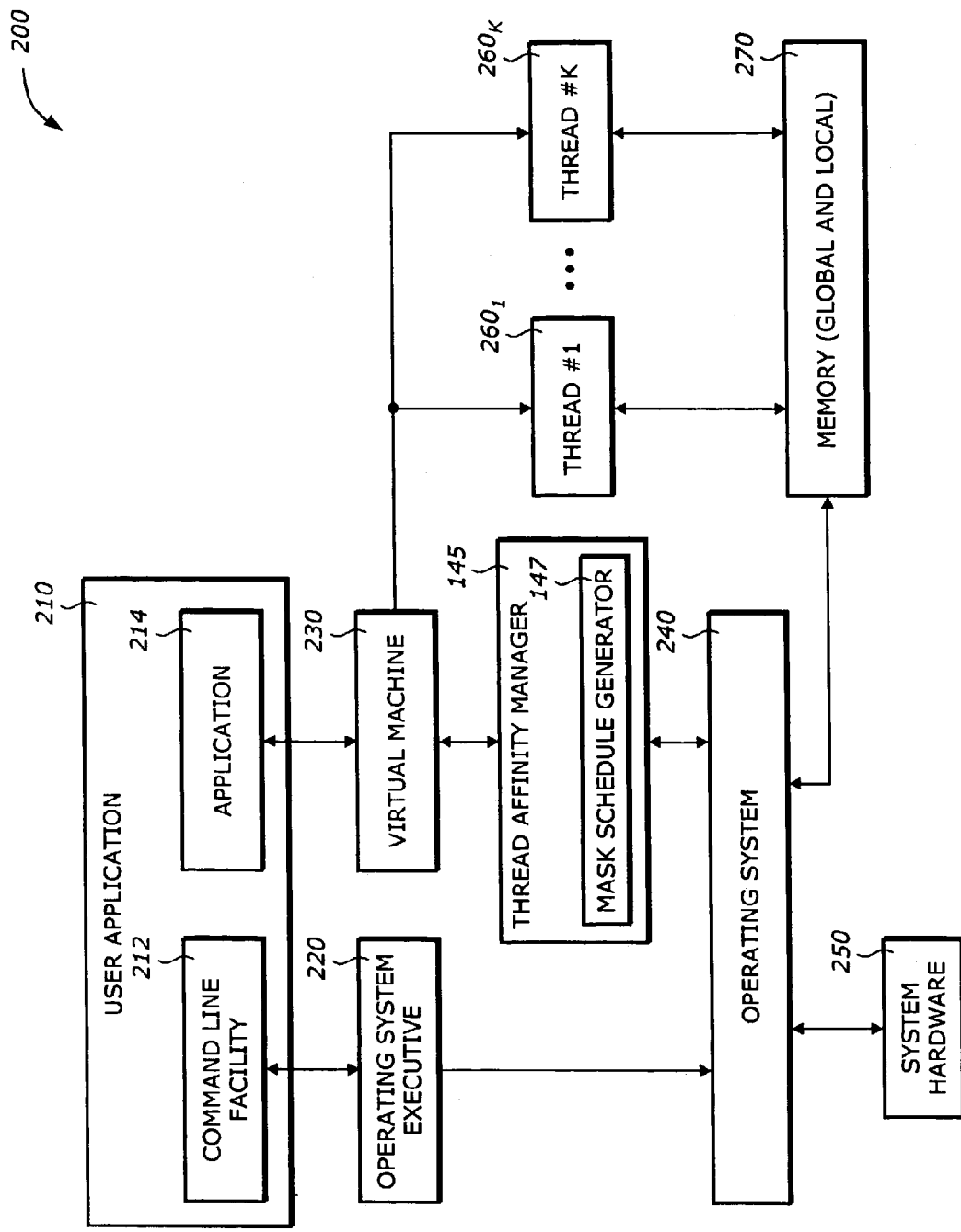
FIG. 2 is a diagram illustrating a software architecture according to one embodiment of the invention.

FIG. 2 is a diagram illustrating a software architecture 200 according to one embodiment of the invention. The software architecture 200 includes a user application 210, an operating system (OS) executive 220, a virtual machine 230, the thread affinity manager 145, an operating system 240, system hardware 250, K threads $260_1$ to $260_K$, and thread memory 270.

The user application 210 is a software layer that is interfaced to the user to allow the user to run, launch, and invoke applications. The user application 210 includes a command line facility 212 and an application 214. The command line facility 212 provides a mechanism to allow the user to control, manage, and configure a particular application program. The command line facility 212 may allow the user to request to launch, execute, or invoke the application 214 by issuing a command line. The command line facility 212 may include functional modules to facilitate command line editing, buffering, or manipulating. The command line may also include application parameters such as thread affinity management, count threshold, thread affinity granularity, argument list, etc. By using the command line facility 212, the user can have control over the thread affinity management such as setting thread affinity flag, selecting affinity granularity, and selecting the thread count threshold. The application 214 is a user program to perform particular tasks within the system 10. Examples of the application 214 may include a graphics program, a server interface program, a database program, or any program that may utilize the multiprocessor architecture provided by the system 10.

The OS executive 220 is a software component that interfaces to the command line facility 220 and the OS 240. The OS executive 220 may be a shell or a command interpreter that interprets the command line as generated by the command line facility 212 and passes the interpreted command line to the OS 240.

The virtual machine 230 provides an environment for executing the application 214. The virtual machine 230 simulates the hardware platform on which the application is run. The virtual machine may include an interpreter, system calls, a library of functions, thread management functions, a garbage collector, and other interfaces. Examples of the virtual machine 230 include a parallel virtual machine (PVM), a Microsof™ virtual machine, and a Java™ virtual machine (JVM).

The thread affinity manager 145 manages thread affinity via interfaces to the virtual machine 230 and the OS 240. The thread affinity manager 145 may perform the following tasks: creating an affinity mask, updating the affinity mask, selecting affinity granularity, directing thread scheduling, assigning threads to clusters of processors. One of the main functions of the thread affinity manager 145 is to select a cluster of processors to assign a thread to. The mask schedule generator 147 generates affinity masks to be used in the selection of appropriate cluster of processors.

The OS 240 performs typical OS functions including process management, protection, scheduling, hardware interfacing, memory management, input/output management, etc. The OS 240 interacts with the system hardware 250 and the memory 270. The system hardware 250 may includes I/O devices, peripheral devices, peripheral controllers, network devices, memory elements, etc. In one embodiment, the OS 240 is one of a Windows™ OS, a Windows DataCenter™, a UNIX OS, a Linux OS, and any other suitable OS for multiprocessor systems.

The threads $260_1$ to $260_K$ are program threads created in user applications such as the application 214. The threads $210_1$ to $260_K$ may also include system threads or kernel threads that are created and run on behalf of the OS 240 or the virtual machine 230. Each of the threads $210_1$ to $260_K$ maintains its own local variables and local resources such as program counter and stack. They also share common global variables and memory. The threads interface to the thread memory 270 for accessing the local and global variables. The thread memory 270 may be any combination of the local caches, local memories, the associated TLC, and the global memories $60_1$ to $60_M$ shown in FIG. 1A.

An active thread is a thread that has been created to run in the application or in the virtual machine. For performance and efficiency, thread is affinitized or assigned to a cluster of processors according to the thread granularity. When a thread is affinitized to a cluster of processors, it shares with other threads most of the resources provided by that cluster of processors, including local memories such as third level cache (TLC). Such sharing within the same granularity level provides high performance because overhead in thread communication can be reduced significantly. In addition, thread migration is minimized, resulting in efficient load balancing and memory usage. It is, therefore, useful to discriminating clusters of processors on the basis of their mutual proximity, memory usage, interconnection structure, and other factors. This can be efficiently done by maintaining a set of granularity masks that reflect the processor configuration.

Figure 3:
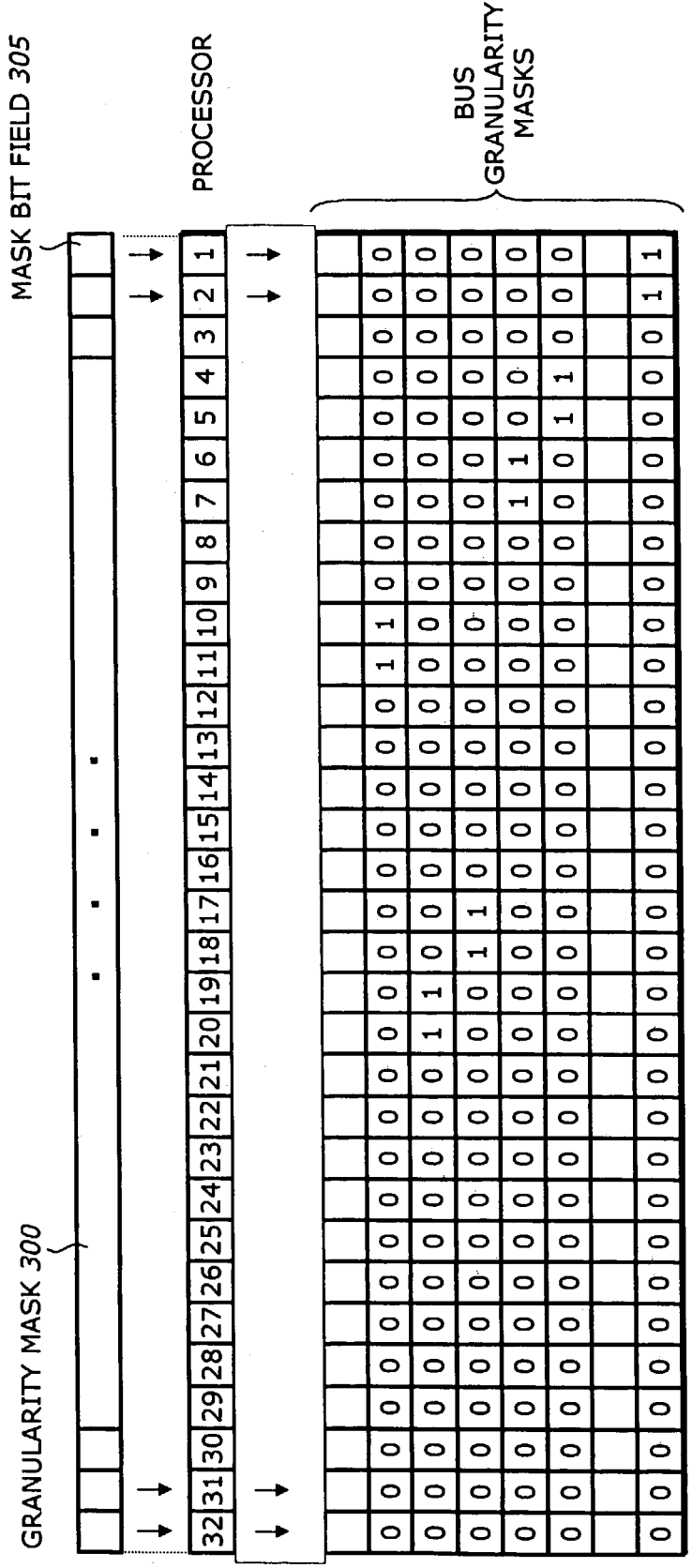
FIG. 3 is a diagram illustrating granularity masks according to one embodiment of the invention.

FIG. 3 is a diagram illustrating a granularity mask 300 according to one embodiment of the invention. The granularity mask 300 is a bit pattern that has been selected to correspond to processors selected for affinitization according to the thread granularity. As discussed above, the thread granularity is configurable to be one of a processor granularity, a bus granularity, a subpod granularity, and a pod granularity. Configurable thread granularity allows the locality of memory accesses to be utilized for maximum system performance. In general, in a system of N processors having a granularity of M processors, there are N/M different granularity masks. The granularity may be selected by the user via the command line facility 212, or if it is not provided, a default value may be selected. Alternatively, the granularity may be obtained dynamically according to the system behavior, processor usage, overall work load distribution, or any other dynamical parameters.

The granularity mask 300 includes N granularity bit fields 305, where N is the number of processors in the system. Each bit field 305 has one bit to correspond to a processor. The bit positions are arranged according to the processor arrangement. As an example, in FIG. 3, there are 32 processors numbered 1 through 32. The state of each bit may be defined to indicate the availability of the corresponding processor. For example, it may indicate whether the corresponding processor is selected for affinitization. Alternatively, it may indicate whether the corresponding processor has been scheduled or affinitized to execute one or more threads. A bit is set to a logical ONE state if the corresponding processor is selected for affinitization and to a logical ZERO otherwise. As is known by one skilled in the art, the bit logical state may be the reverse, i.e., a logical ZERO indicates the corresponding processor is selected for affinitization, and logical ONE otherwise. The definition of the active level of the mask bit (e.g., logical ONE or ZERO) depends on the combining operator to merge the granularity mask with the current affinity mask in producing the new affinity mask. This combining operator may be any suitable logic function such as bitwise OR or AND operation. It is also contemplated that the granularity mask may have any other form or representation. For example, the granularity bit field 305 may have several bits to indicate several processor attributes such as affinitization selection, memory locality characteristics, preference usage (e.g., system tasks, application tasks), etc. Another representation may be a data structure with pointers to point to processor attribute blocks. As is know by one skilled in the art, appropriate application interfaces, drivers, or procedure calls to allow access to the granularity bit field 305 may be required for OS interfacing.

In the example shown in FIG. 3, the thread granularity is a bus granularity, i.e., a thread can be assigned to any one of two processors connected to the same bus. The granularity mask 300, therefore, consists of adjacent bits appearing in pairs to correspond to a pair of processors in each bus. For a processor granularity, the granularity mask 300 consists of a single bit at the active level at a particular processor position. Similarly, for a sub pod and pod granularities, the granularity mask 300 consists of four and eight adjacent bits at the active level. The adjacency here is to refer to the manner in which the numbering of the bit position indicates the physical position of a processor with respect to another. The essential concept is that the granularity mask bits are at the active level when the corresponding processors share the same common resources or physical connections such as a processor, a bus, a TLC, or a crossbar interconnect switch, or any other suitable common resources.

Figure 4:
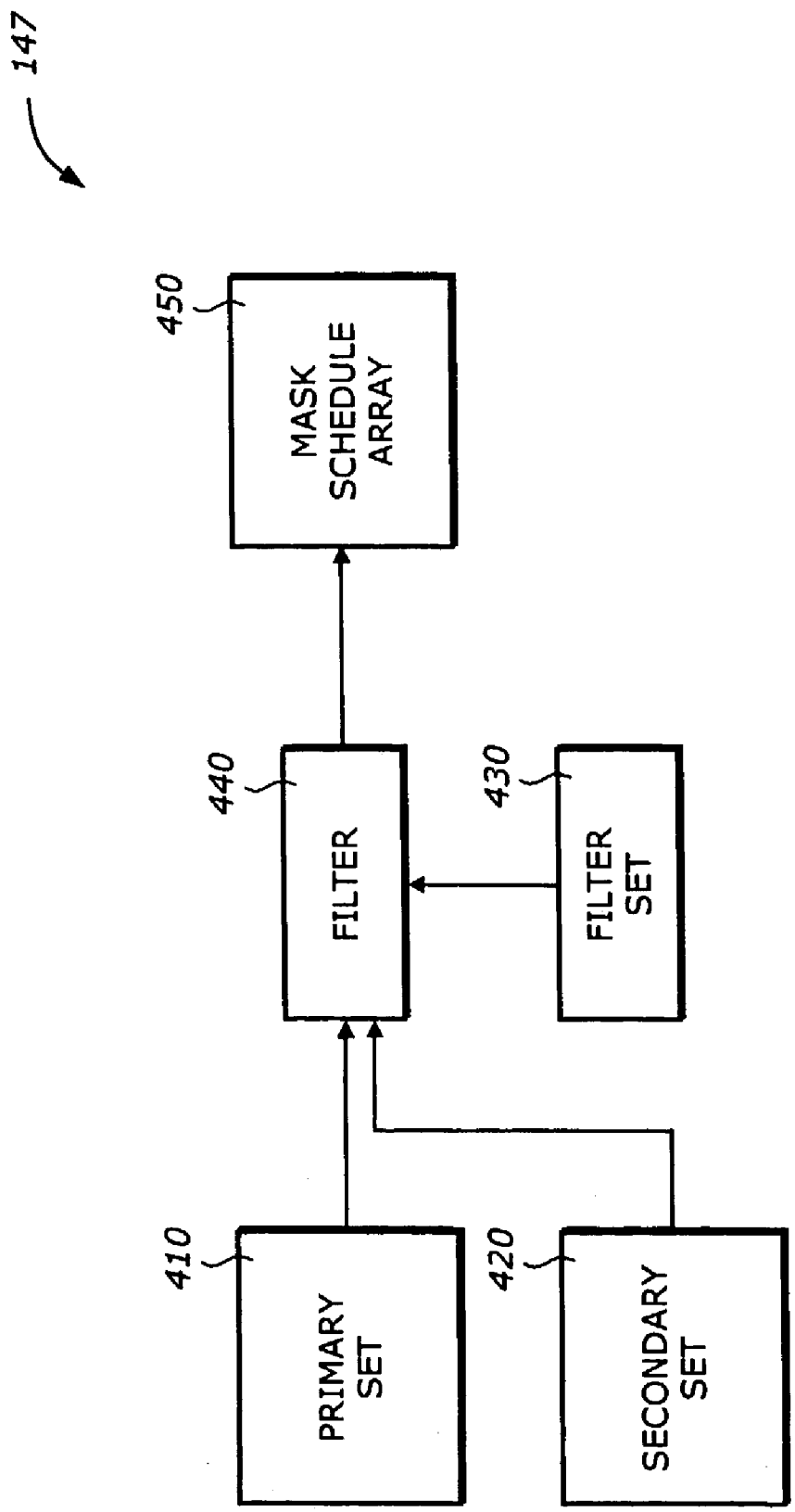
FIG. 4 is a diagram illustrating a mask schedule generator according to one embodiment of the invention.

FIG. 4 is a diagram illustrating a mask schedule generator 147 according to one embodiment of the invention. The mask schedule generator 147 includes a primary set 410, a secondary set 420, a filter set 430, a filter 440, and mask schedule array 450.

The primary set 410 is a set of granularity masks created according to the thread granularity as selected by the system or by the user. Typically, the granularity masks in this set are typically those of the form shown in FIG. 3. The primary set 410 is pre-determined and represents the processor configuration at all the available granularities. For example, in a system of N=32 processors having processor, bus, subpod, and pod granularities with sizes of one, two, four, and eight processors, the primary set 410 includes 32 processor granularity masks, 16 bus granularity masks, 8 subpod granularity masks, and 4 pod granularity masks. The primary set 410 is typically determined in advance and stored in memory or a table for later retrieval.

The secondary set 420 is a set of granularity masks also created according to the thread granularity. The granularity masks in this set, however, may be of different form than that of the primary set 410. Typically, these masks represent special circumstances or are created to satisfy some requirements or criteria where availability of certain processor or processors are known. To facilitate retrieval and indexing, the secondary granularity masks may be arranged to correspond to the primary granularity masks. Furthermore, the active level of the secondary granularity mask bits may be the same or complementary to that of the primary granularity mask bits. The secondary set 410 is typically determined in advance and stored in memory or a table for later retrieval.

The filter set 430 contains a set of filter masks. Each filter mask is a bit pattern representing availability of processors in the system for a particular system configuration or session. If this bit pattern is fixed and constant, the filter set 430 may contain only one filter mask. The filter set 430 may be provided by the user via the command line facility 212 (FIG. 2) or dynamically based on some system behavior or criteria. For example, suppose it is known that a cluster of processors have been scheduled to execute a number of high priority threads, it may be desirable to mark these processors unavailable. The active level of the filter mask bits is selected to be consistent with that of the primary and secondary granularity mask bits and to facilitate the operations in the filter 440.

The filter 440 filters or transforms the primary and/or secondary granularity masks in the primary and/or secondary sets 410 and 420 using a filter mask selected from the filter set 430. The filter 440 may eliminate any primary and/or secondary granularity masks that are invalid or correspond to unavailable processor(s). In general, the filter 440 collapses the size of the primary/secondary granularity masks into a reduced set of affinity masks that can be used for thread affinitization during run-time. Gaps in the primary or secondary sets representing invalid masks are removed. The resulting affinity masks may contain bit patterns that represent any combination of processors that is suitable for thread affinitization. The bits in the affinity masks may be contiguous or non-contiguous.

The mask schedule array 450 stores affinity masks provided by the filter 440. In general, it is more compact than the primary and/or secondary sets 410 and 420. The mask schedule array 450 may be a composite set of mask schedules or may be divided into two groups: one for the primary set 410 and one for the secondary set 420. Once generated for an application thread, the mask schedule array 450 may be repeatedly applied during the course of execution of the application 214 hosted by the VM 230 as shown in FIG. 2. If the state of the system is maintained and the same application 214 is re-executed under identical or similar conditions, then the process is capable of repeatedly recreating settings to produce optimal performance as configured during initialization. Even if the same application 214 is re-executed under non-identical conditions and as a result, a different set of affinity masks may be used, the process is still capable of providing optimal performance because these affinity masks have been selected and configured taking into account overall system configuration and requirements during the initialization phase of the VM 230.

Figure 5:
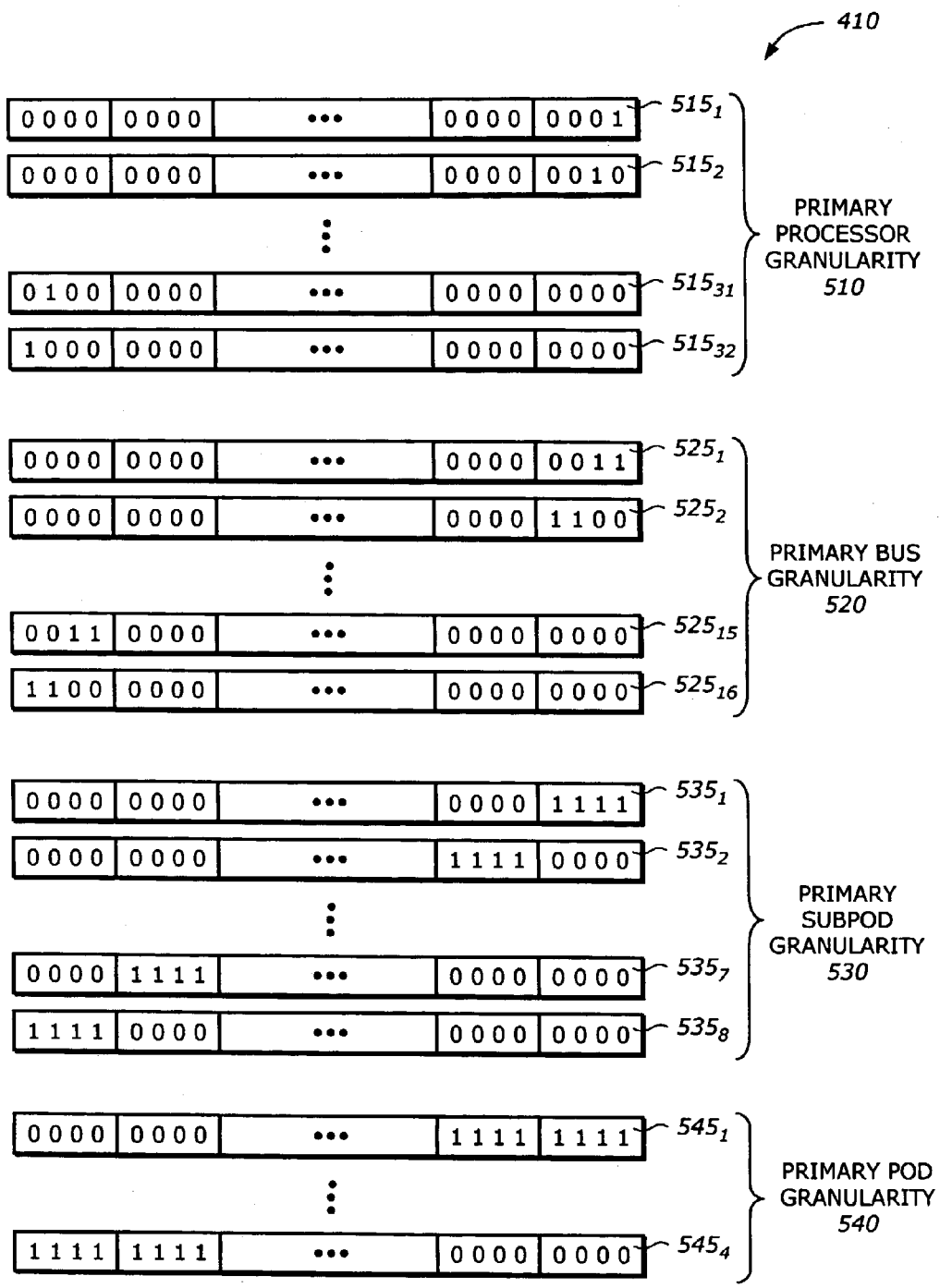
FIG. 5 is a diagram illustrating a primary set of granularity masks according to one embodiment of the invention.

FIG. 5 is a diagram illustrating the primary set 410 of granularity masks according to one embodiment of the invention. The primary set 410 is created for the processor, bus, subpod, and pod granularities in a system having N=32 processors. The primary set 410 includes four groups: a primary processor granularity group 510, a primary bus granularity group 520, a primary subpod granularity group 530, and a primary pod granularity group 540.

The primary processor granularity group 510 includes N=32 granularity masks $515_1$ to $515_{32}$. Each of the granularity masks $515_1$ to $515_{32}$ contains a single bit at the active level indicating that the corresponding processor is available for thread affinitization under processor granularity. Similarly, the primary bus granularity group 520 includes N/2=16 granularity masks $525_1$ to $525_{16}$; the primary subpod granularity group 530 includes N/4=8 granularity masks $535_1$ to $535_8$; and the primary pod granularity group 540 includes N/8=4 granularity masks $545_1$ to $545_4$. Note that although these masks are preferred, any bit patterns may be used as primary masks. As shown, these granularity masks are shown below where 0x indicates hexadecimal notation.

| Processor | Bus | Subpod | Pod |
|---|---|---|---|
| 0x00000001 | 0x00000003 | 0x0000000F | 0x000000FF |
| 0x00000002 | 0x0000000C | 0x000000F0 | 0x0000FF00 |
| 0x00000004 | 0x00000030 | 0x00000F00 | 0x00FF0000 |
| 0x00000008 | 0x000000C0 | 0x0000F000 | 0xFF000000 |
| 0x00000010 | 0x00000300 | 0x000F0000 | |
| 0x00000020 | 0x00000C00 | 0x00F00000 | |
| 0x00000040 | 0x00003000 | 0x0F000000 | |
| 0x00000080 | 0x0000C000 | 0xF0000000 | |
| 0x00000100 | 0x00030000 | | |
| 0x00000200 | 0x000C0000 | | |
| 0x00000400 | 0x00300000 | | |
| 0x00000800 | 0x00C00000 | | |
| 0x00001000 | 0x03000000 | | |
| 0x00002000 | 0x0C000000 | | |
| 0x00004000 | 0x30000000 | | |
| 0x00008000 | 0xC0000000 | | |
| 0x00010000 | | | |

-continued

| Processor | Bus | Subpod | Pod |
|---|---|---|---|
| 0x00020000 | | | |
| 0x00040000 | | | |
| 0x00080000 | | | |
| 0x00100000 | | | |
| 0x00200000 | | | |
| 0x00400000 | | | |
| 0x00800000 | | | |
| 0x01000000 | | | |
| 0x02000000 | | | |
| 0x04000000 | | | |
| 0x08000000 | | | |
| 0x10000000 | | | |
| 0x20000000 | | | |
| 0x40000000 | | | |
| 0x80000000 | | | |

Figure 6:
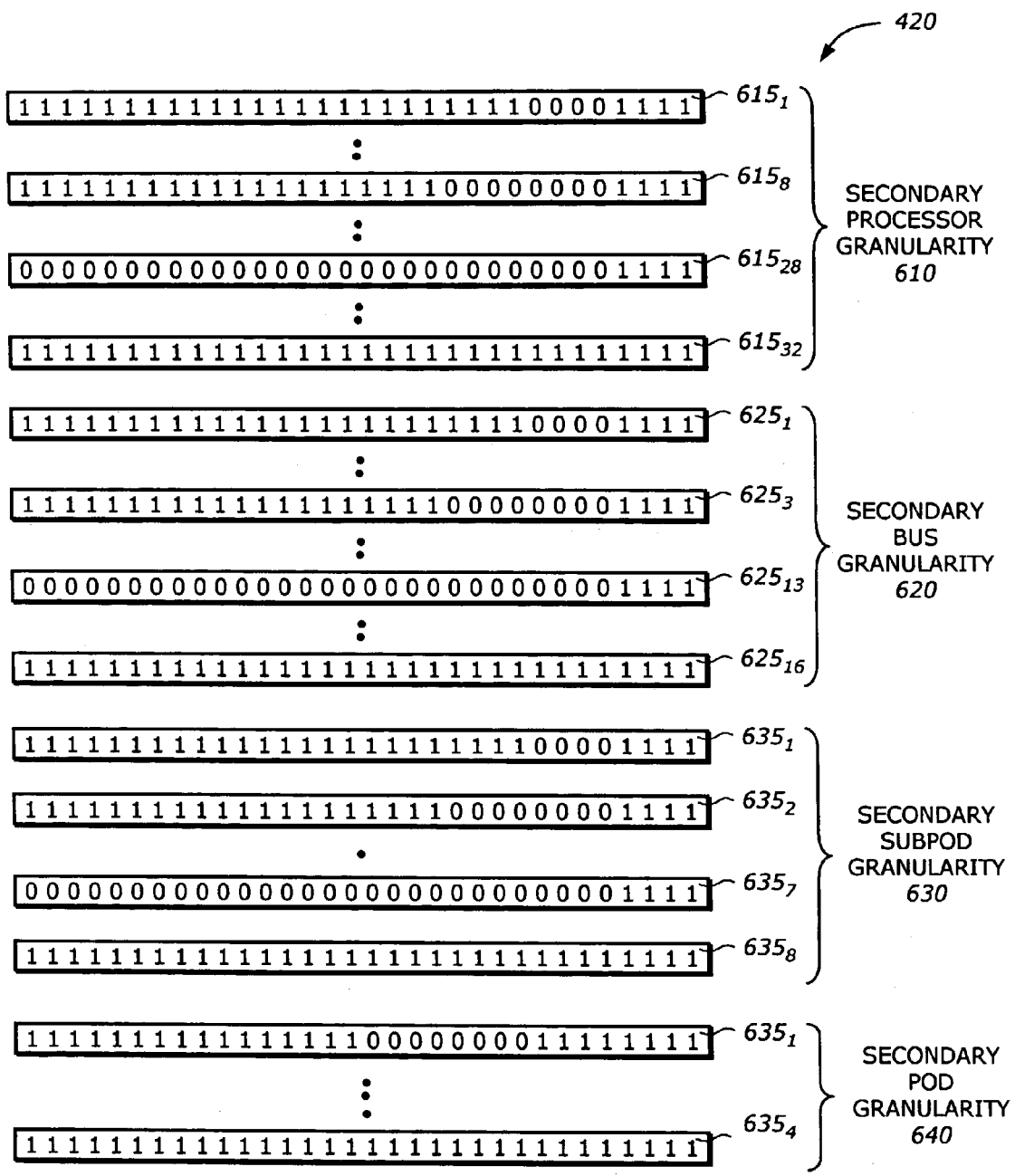
FIG. 6 is a diagram illustrating a secondary set of granularity masks according to one embodiment of the invention.

FIG. 6 is a diagram illustrating the secondary set 420 of granularity masks according to one embodiment of the invention. The second set 420 is created for the processor, bus, subpod, and pod granularities in a system having N=32 processors. The secondary set 420 includes four groups: a secondary processor granularity group 610, a secondary bus granularity group 620, a secondary subpod granularity group 630, and a secondary pod granularity group 640.

The secondary processor granularity group 610 includes N=32 granularity masks $615_1$ to $615_{32}$. Similarly, the secondary bus granularity group 620 includes N/2=16 granularity masks $625_1$ to $625_{16}$; the secondary subpod granularity group 630 includes N/4=8 granularity masks $635_1$ to $635_8$; and the secondary pod granularity group 640 includes N/8=4 granularity masks $645_1$ to $645_4$. The secondary granularity masks do not have any regular patterns. They are mainly created based on knowledge or a priori information on a particular type of thread. For example, a system thread to perform a major garbage collection may be assigned to processors that are reserved for VM threads. The patterns shown in FIG. 6 are mainly for illustrative purposes. The objective is to show that the secondary granularity masks may have any form and may contain non-adjacent groups of active level bits. For example, the mask $615_1$ shows that the group of processors from $P_5$ to $P_8$ are not available while the rest can be used.

Once the primary set 410 and the secondary set 420 are created, the VM 230 then generates the mask schedule for use for an active thread. The active thread may be an application thread or a VM thread. The generation of the mask schedule is performed by a filtering process using the filter 440. The filter 440 in essence extracts a granularity mask from the primary set 410 and/or the secondary set 420, applies a filtering function to the mask using the filter mask 430, then determines if the resulting affinity mask is usable. A usable affinity mask is one in which there is at least an active bit, indicating that at least one processor is available for affinitization. If the resulting affinity mask is not usable after the filtering or transformation, it is discarded. Note that the use of the secondary set 420 is optional and may not be needed. In the following discussion, it is assumed that the secondary set 420 is used in the filtering process.

Let pmask[i], smask[i], paffinity[k] and saffinity[k] be the primary granularity mask, the secondary granularity mask, the primary affinity mask and the secondary affinity mask, respectively, where j and k are the indices to the tables or arrays. Let np and nschedule be the total numbers of the primary granularity masks in the primary set 410 and the affinity masks in the mask schedule array 450, respectively.

Let filtermask be a filter mask obtained from the filter set 430. Let && denote the bitwise AND operation. In one embodiment, the filtering process may be described in the following pseudo code.

```
k=0;
for (i=0; i<np; i++)
{
ptest=pmask[i] &&filtermask;
if (ptest !=0x0)
{
   paffinity[k]=ptest;
   saffinity[k]=smask[i] &&filtermask
   k+=1;
}
}
nschedule=k
```

Figure 7:
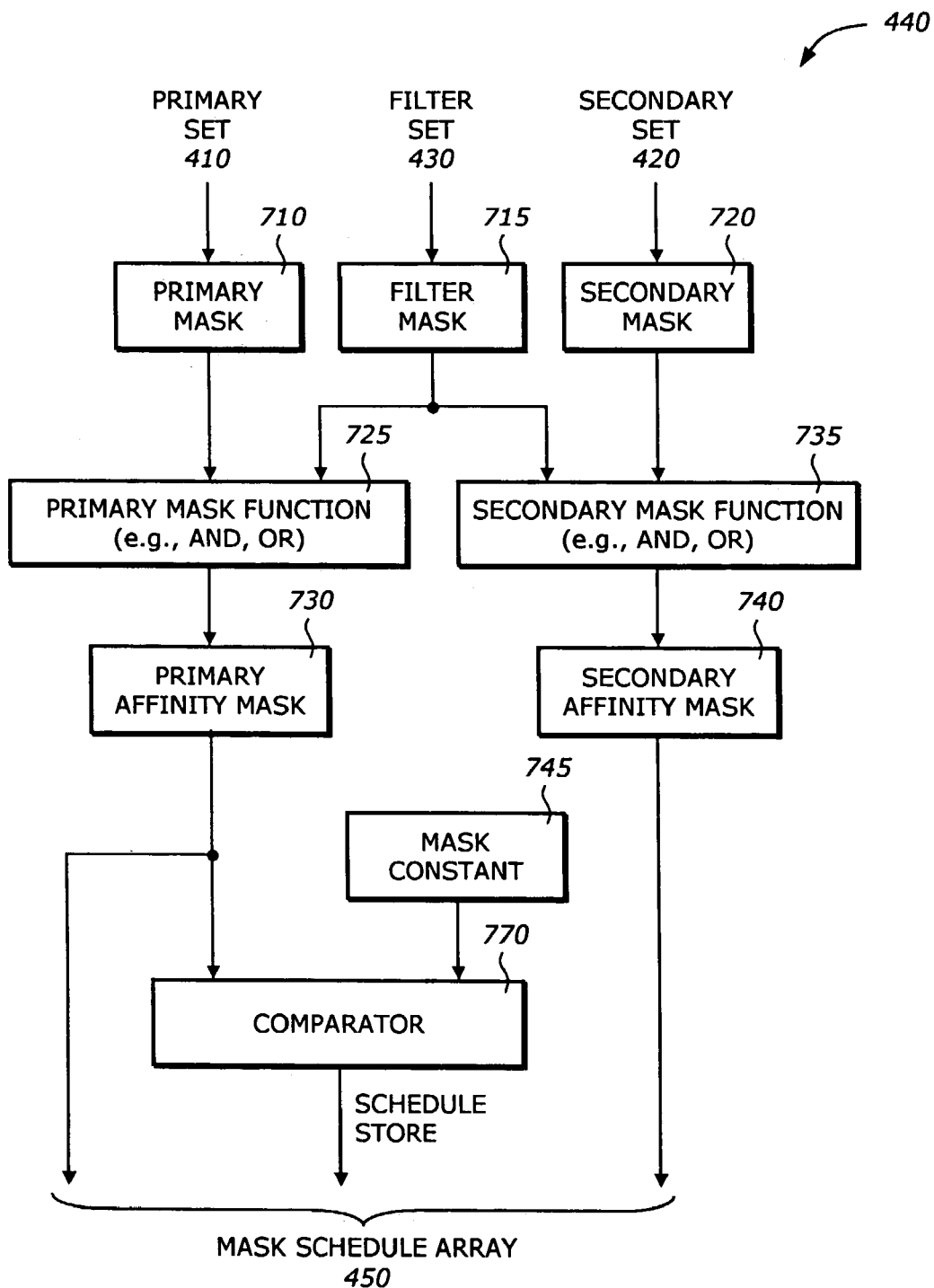
FIG. 7 is a diagram illustrating a filter according to another embodiment of the invention.

FIG. 7 is a diagram illustrating the filter 440 according to another embodiment of the invention. The filter 440 receives inputs from the primary set 410, secondary set 410 and filter set 430. In this embodiment, the primary set 410 and the secondary set 420 are of the same size and contain the same number of granularity masks at each granularity. The filter 440 includes a primary mask function 725, a secondary mask function 735 and a comparator 770.

The primary mask function 725 performs an operation on a primary mask 710 and a filter mask 715 to generate a primary affinity mask 730. The secondary mask function 735 performs another operation on a secondary mask 720 and the filter mask 715 to generate a secondary affinity mask 740. The primary mask 710, the secondary mask 720, and the filter mask 715 are obtained from the primary set 410, the secondary set 420, and the filter set 430, respectively. The operations performed by the primary and secondary mask functions 725 and 735 depends of on the active level of the mask bits. When the active level is logical TRUE, the primary and secondary mask functions may perform an AND operation. As before, the filter mask 715 masks out the bits that correspond to unavailable processors.

The comparator 770 compares the primary affinity mask 730 with a mask constant 745 to determine if the primary affinity mask 730 is saved or discarded. If the primary affinity mask 730 shows that there is no available processor, i.e., when it contains all zero's, it is discarded. The mask constant 745 is 0x0. The comparator 770 generates a schedule store signal or flag to store the resulting primary and secondary affinity masks 730 and 740 in the mask schedule 450 is the primary affinity mask 730 is not equal to the mask constant 745.

Figure 8:
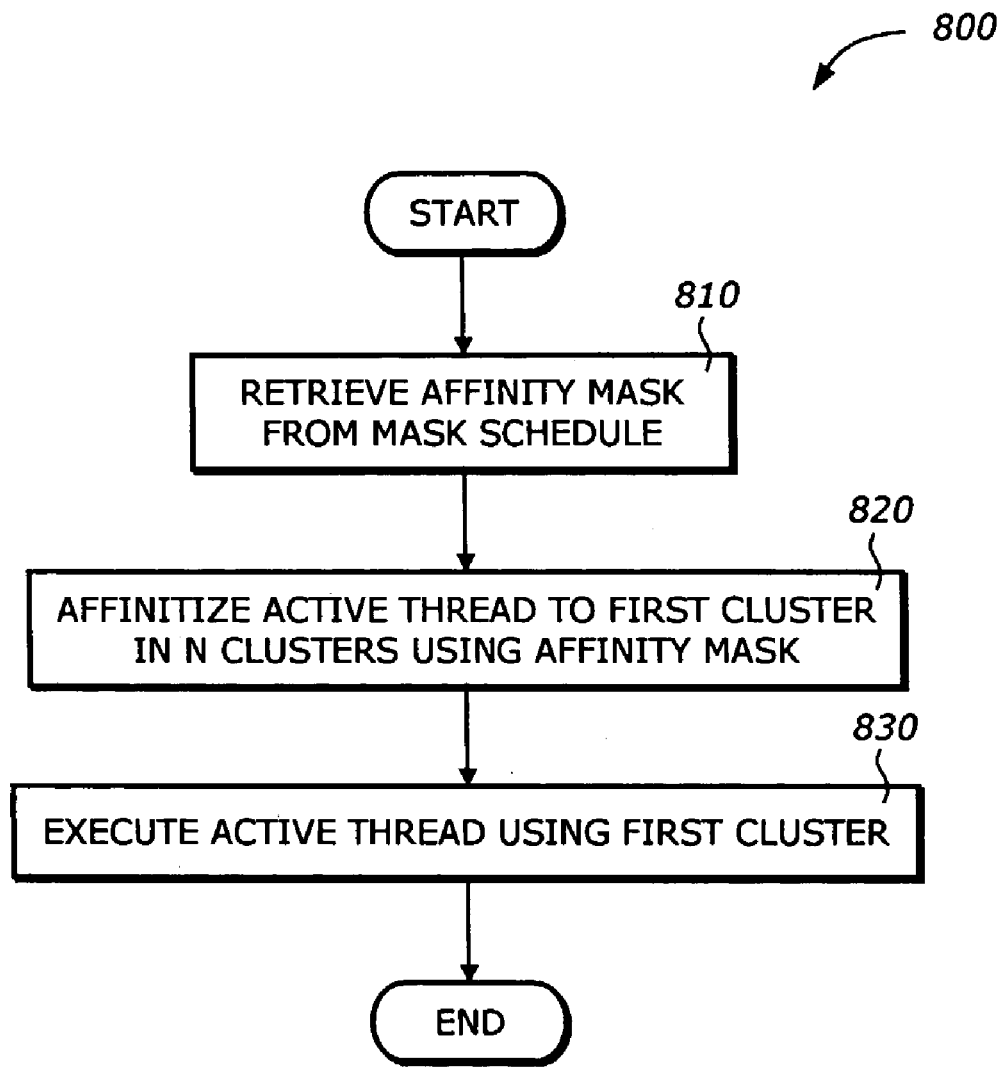
FIG. 8 is a flowchart illustrating a process to use a mask schedule according to one embodiment of the invention.

FIG. 8 is a flowchart illustrating a process 800 to use a mask schedule according to one embodiment of the invention.

Upon START, the process 800 retrieves an affinity mask from a mask schedule array (Block 810). The affinity mask may be generated by filtering the primary mask using the filter mask.

Then, the process 800 affinitizes an active thread to a first cluster of processors in the N clusters of processors using the retrieved affinity mask (Block 820). Next, the process 800 executes the active thread using the first cluster of processors (Block 830) and is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
obtaining a primary mask from a primary set of granularity masks, the granularity masks being created according to a thread granularity in a multiprocessor system having N clusters of processors; and
filtering the primary mask using a filter mask to generate a first affinity mask.

2. The method of claim 1 further comprising:
storing the first affinity mask in a mask schedule.

3. The method of claim 1 further comprising:
affinitizing an active thread to a first cluster in the N clusters of processors using the first affinity mask.

4. The method of claim 3 further comprising:
executing the active thread using the first cluster.

5. The method of claim 1 further comprising:
obtaining a secondary mask from a secondary set of the granularity masks; and
filtering the secondary mask using the filter mask to generate a second affinity mask.

6. The method of claim 5 further comprising:
storing the second affinity mask in a mask schedule.

7. The method of claim 5 further comprising:
affinitizing an active thread to a first cluster in the N clusters of processors using the second affinity mask.

8. The method of claim 7 further comprising:
executing the active thread using the first cluster.

9. The method of claim 1 wherein obtaining comprises:
obtaining the primary granularity mask from the primary set of default granularity masks, the default granularity masks being created according to the thread granularity in the multiprocessor system having N clusters of processors, the multiprocessor system being a cellular multiprocessor system.

10. The method of claim 1 wherein obtaining comprises:
obtaining the primary granularity mask from the primary set of default granularity masks, the default granularity masks being created according to the thread granularity in the multiprocessor system having N clusters of processors, the thread granularity being one of a processor granularity, a bus granularity, a subpod granularity, and a pod granularity.

11. The method of claim 1 wherein filtering the primary mask comprises:
performing an operation on the primary mask using the filter mask to generate a result; and
saving the result as the first affinity mask if the result is not equal to a mask constant.

12. The method of claim 11 wherein performing an operation comprises:
performing one of an OR operation and an AND operation on the primary mask using the filter mask to generate the result.

13. The method of claim 12 wherein saving the result comprises:
saving the result as the first affinity mask if the result is not equal to one of an OR constant and an AND constant.

14. The method of claim 13 further comprising:
executing the active thread using the first cluster.

15. The method of claim 1 further comprising:
obtaining a secondary mask from a secondary set of the granularity masks; and
filtering the secondary mask using the filter mask to generate a second affinity mask.

16. The method of claim 15 further comprising:
storing at least one of the first and second affinity masks in a mask schedule.

17. The method of claim 15 farther comprising:
affinitizing an active thread to a first cluster in the N clusters of processors using the second affinity mask.

18. A method comprising:
retrieving an affinity mask from a mask schedule, the affinity mask being generated by filtering a primary mask using a filter mask, the primary mask being selected from a primary set of granularity masks, the granularity masks being created according to a thread granularity in a multiprocessor system having N clusters of processors; and
affinitizing an active thread to a first cluster in the N clusters of processors using the affinity mask.

19. The method of claim 18 wherein retrieving the affinity mask comprises:
retrieving the affinity mask from the mask schedule, the affinity mask being generated by filtering a secondary mask using the filter mask, the secondary mask being selected from a secondary set of granularity masks.

20. The method of claim 18 further comprising:
executing the active thread using the first cluster.

21. An article of manufacture comprising:
a machine-accessible medium including data that, when accessed by a machine, causes the machine to perform operations comprising:
obtaining a primary mask from a primary set of granularity masks, the granularity masks being created according to a thread granularity in a multiprocessor system having N clusters of processors; and
filtering the primary mask using a filter mask to generate a first affinity mask.

22. The article of manufacture of claim 21 wherein the data further comprising data that, when accessed by the machine, causes the machine to perform operations comprising:
storing the first affinity mask in a mask schedule.

23. The article of manufacture of claim 21 wherein the data further comprising data that, when accessed by the machine, causes the machine to perform operations comprising:
affinitizing an active thread to a first cluster in the N clusters of processors using the first affinity mask.

24. The article of manufacture of claim 23 wherein the data further comprising data that, when accessed by the machine, causes the machine to perform operations comprising:
executing the active thread using the first cluster.

25. The article of manufacture of claim 21 wherein the data further comprising data that, when accessed by the machine, causes the machine to perform operations comprising:
obtaining a secondary mask from a secondary set of the granularity masks; and
filtering the secondary mask using the filter mask to generate a second affinity mask.

26. The article of manufacture of claim 25 wherein the data further comprising data that when accessed by the machine, causes the machine to perform operations comprising:
storing the second affinity mask in a mask schedule.

27. The article of manufacture of claim 25 wherein the data further comprising data that, when accessed by the machine, causes the machine to perform operations comprising:
affinitizing an active thread to a first cluster in the N clusters of processors using the second affinity mask.

28. The article of manufacture of claim 27 wherein the data further comprising data that, when accessed by the machine, causes the machine to perform operations comprising:
executing the active thread using the first cluster.

29. The article of manufacture of claim 21 wherein the data causing the machine to perform obtaining comprises data that, when accessed by the machine, causes the machine to perform operations comprising:
obtaining the primary granularity mask, from the primary set of default granularity masks, the default granularity masks being created according to the thread granularity in the multiprocessor system having N clusters of processors, the multiprocessor system being a cellular multiprocessor system.

30. The article of manufacture of claim 21 wherein the data causing the machine to perform obtaining comprises data that, when accessed by the machine, causes the machine to perform operations comprising:
obtaining the primary granularity mask from the primary set of default granularity masks, the default granularity masks being created according to the thread granularity in the multiprocessor system having N clusters of processors, the thread granularity being one of a processor granularity, a bus granularity, a subpod granularity, and a pod granularity.

31. The article of manufacture of claim 21 wherein the data causing the machine to perform filtering the primary mask comprises data that, when accessed by the machine, causes the machine to perform operations comprising:
performing an operation on the primary mask using the filter mask to generate a result; and
saving the result as the first affinity mask if the result is not equal to a mask constant.

32. The article of manufacture of claim 31 wherein the data causing the machine to perform an operation comprises data that, when accessed by the machine, causes the machine to perform operations comprising:
performing one of an OR operation and an AND operation on the primary mask using the filter mask to generate the result.

33. The article of manufacture of claim 32 wherein the data causing the machine to perform saving the result comprises data that, when accessed by the machine, causes the machine to perform operations comprising:
saving the result as the first affinity mask if the result is not equal to one of an OR constant and an AND constant.

34. The article of manufacture of claim 33 wherein the data further comprising data that, when accessed by the machine, causes the machine to perform operations comprising:
executing the active thread using the first cluster.

35. The article of manufacture of claim 21 wherein the data further comprising data that, when accessed by the machine, causes the machine to perform operations comprising:
obtaining a secondary mask from a secondary set of the granularity masks; and
filtering the secondary mask using the filter mask to generate a second affinity mask.

36. The article of manufacture of claim 35 wherein the data further comprising data that, when accessed by the machine, causes the machine to perform operations comprising:
storing at least one of the first and second affinity masks in a mask schedule.

37. The article of manufacture of claim 35 wherein the data further comprising data that, when accessed by the machine, causes the machine to perform operations comprising:
  affinitizing an active thread to a first cluster in the N clusters of processors using the second affinity mask.

38. An article of manufacture comprising:
  a machine-accessible medium including data that, when accessed by a machine, causes the machine to perform operations comprising:
    retrieving an affinity mask from a mask schedule, the affinity mask being generated by filtering a primary mask using a filter mask, the primary mask being selected from a primary set of granularity masks, the granularity masks being created according to a thread granularity in a multiprocessor system having N clusters of processors; and
    affinitizing an active thread to a first cluster in the N clusters of processors using the affinity mask.

39. The article of manufacture of claim 38 wherein the data causing the machine to perform retrieving the affinity mask comprises data that, when accessed by the machine, causes the machine to perform operations comprising:
  retrieving the affinity mask from the mask schedule, the affinity mask being generated by filtering a secondary mask using the filter mask, the secondary mask being selected from a secondary set of granularity masks.

40. The article of manufacture of claim 38 wherein the data further comprises data that, when accessed by the machine, causes the machine to perform operations comprising:
  executing the active thread using the first cluster.

41. A system comprising:
  N clusters of processors; and
  a memory coupled to a processor in the N clusters of processors, the memory containing program code that, when executed by the processor, causes the processor to:
    obtain a primary mask from a primary set of granularity masks, the granularity masks being created according to a thread granularity, and
    filter the primary mask using a filter mask to generate a first affinity mask.

42. The system of claim 41 wherein the program code, when executed by the processor, further causes the processor to:
  store the firs-t affinity mask in a mask schedule.

43. The system of claim 41 wherein the program code, when executed by the processor, further causes the processor to:
  affinitize an active thread to a first cluster in the N clusters of processors using the first affinity mask.

44. The system of claim 43 wherein the program code, when executed by the processor, further causes the processor to;
  execute the active thread using the first cluster.

45. The system of claim 41 wherein the program code, when executed by the processor, further causes the processor to:
  obtain a secondary mask from a secondary set of the granularity masks; and
  filter the secondary mask using the filter mask to generate a second affinity mask.

46. The system of claim 45 wherein the program code, when executed by the processor, further causes the processor to:
  store the second affinity mask in a mask schedule.

47. The system of claim 45 wherein the program code, when executed by the processor, further causes the processor to;
  affinitize an active thread to a first cluster in the N clusters of processors using the second affinity mask.

48. The system of claim 47 wherein the program code, when executed by the processor, further causes the processor to:
  execute the active thread using the first cluster.

49. The system of claim 41 wherein the program code causing the processor to obtain causes the processor to:
  obtain the primary granularity mask from the primary set of default granularity masks, the default granularity masks being created according to the thread granularity in the multiprocessor system having N clusters of processors, the multiprocessor system being a cellular multiprocessor system.

50. The system of claim 41 wherein the program code causing the processor to obtain causes the processor to:
  obtain the primary granularity mask from the primary set of default granularity masks, the default granularity masks being created according to the thread granularity in the multiprocessor system having N clusters of processors, the thread granularity being one of a processor granularity, a bus granularity, a subpod granularity, and a pod granularity.

51. The system of claim 41 wherein the program code causing the processor to filter the primary mask causes the processor to:
  perform an operation on the primary mask using the filter mask to generate a result; and
  save the result as the first affinity mask if the result is not equal to a mask constant.

52. The system of claim 51 wherein the program code causing the processor to perform an operation causes the processor to:
  perform one of an OR operation and an AND operation on the primary mask using the filter mask to generate the result.

53. The system of claim 52 wherein the program code causing the processor to save the result causes the processor to:
  save the result as the first affinity mask if the result is not equal to one of an OR constant and an AND constant.

54. The system of claim 53 wherein the program code, when executed by the processor, further causes the processor to:
  execute the active thread using the first cluster.

55. The system of claim 41 wherein the program code, when executed by the processor, further causes the processor to:
  obtain a secondary mask from a secondary set of the granularity masks; and
  filter the secondary mask using the filter mask to generate a second affinity mask.

56. The system of claim 55 wherein the program code, when executed by the processor, further causes the processor to:
  store at least one of the first and second affinity masks in a mask schedule.

57. The system of claim 55 wherein the program code, when executed by the processor, further causes the processor to:
  affinitize an active thread to a first cluster in the N clusters of processors using the secondary affinity mask.

58. A system comprising:

N clusters of processors; and a memory coupled to a processor in the N clusters of processors, the memory containing program code that, when executed by the processor, causes the processor to:

retrieve an affinity mask from a mask schedule, the affinity mask being generated by filtering a primary mask using a filter mask, the primary mask being selected from a primary set of granularity masks, the granularity masks being created according to a thread granularity; and affinitize an active thread to a first cluster in the N clusters of processors using the affinity mask.

59. The system of claim 58 wherein the program code causing the processor to retrieve the affinity mask causes the processor to:

retrieve the affinity mask from the mask schedule, the affinity mask being generated by filtering a secondary mask using the filter mask, the secondary mask being selected from a secondary set of granularity masks.

60. The system of claim 58 wherein the program code further causes the processor to:

execute the active thread using the first cluster.

* * * * *